Patented Aug. 11, 1953

2,648,696

UNITED STATES PATENT OFFICE 2,648,696

MIXED ACID ANHYDRIDES AND PROCESS FOR PRODUCTION OF SAME

Richard R. Whetstone, Orinda, Calif., assignor to Shell Development Company, Emeryville, Calif., a corporation of Delaware No Drawing. Application June 19, 1951,
Serial No. 232,481

17 Claims. (Cl. 260—461)

This invention relates to a method for the preparation of mixed acid anhydrides and it more particularly relates to a method for the preparation of such mixed acid anhydrides wherein one of the acid residues, or acyl groups, is derived from a phosphoric acid of the class consisting of phosphoric acid and thiophosphoric acid and a second acyl radical is derived from a dissimilar acid. Still more particularly, the invention relates to a method for the production of mixed acid anhydrides of phosphoric acid, any acid functions of the phosphoric acid that are not combined in anhydride linkage being combined in ester linkage, and dissimilar acids, particularly carboxylic acids. Some of the products of the invention are novel types of compounds; a still further aspect of the invention relates to certain of these novel compounds and types of compounds as new compositions of matter.

There has been reported a method for the preparation of the mixed acid anhydride of dibenzyl phosphoric acid and acetic acid by reaction between silver dibenzyl phosphate and acetyl chloride, silver chloride being formed as a by-product. Although apparently adequate for laboratory purposes, the method has little value for large scale preparation due to the difficulty of preparing the silver dibenzyl phosphate and because of the cost of the same. An apparently more convenient method for the preparation of the mixed acid anhydride of dibenzyl phosphoric acid and acetic acid has also been reported, involving treatment of dibenzyl phosphoric acid with ketene. In this case also, however, the preparation of the necessary intermediate, namely, the dibenzyl phosphate, is troublesome and costly. Furthermore, for practical purposes the method is restricted to the preparation of the acetyl derivative, since of the various ketenes, ketene is the only one that can be prepared readily, on large scale and at reasonable cost.

According to the present invention, there now is provided a new and effective method for the preparation of mixed acid anhydrides derived from phosphoric acid and dissimilar acids. The method of the present invention has been found to be adaptable to the production of desired product in good yields and conversions. It also is a method having wide applicability to the preparation of mixed acid anhydrides of the general class hereinbefore and hereinafter more fully defined. In many cases, the starting materials that are required in the method of the present invention can be obtained or prepared at low cost, and in a number of cases the starting materials are already commercially available in quantity. The preparation of costly intermediates, such as the silver compounds employed in the prior art processes, also is avoided by the procedure that is provided by the present invention. Because of the relative simplicity of the required procedure, the method of the present invention is well adapted to efficient application on a large scale. These and other advantages of the method of the present invention will be brought forth more fully in the following more detailed disclosures of the invention.

It has been discovered in accordance with this invention that triesters of phosphoric acid, when reacted with acid halides of dissimilar acids, combine with such acid halides with direct formation of mixed acid anhydride in which one of the acid residues, or acyl groups, is the phosphoryl group, any valencies that are not satisfied by anhydride linkage being satisfied by ester linkage, and the second acid residue is the acyl group of the acid halide reactant. Thus, it has been discovered that, when a trialkyl phosphate is heated at a suitable temperature with an equimolar amount of a carboxylic acid halide, the two materials react to produce as the principal product the mixed acid anhydride of the corresponding dialkyl phosphoric acid and the carboxylic acid and, as by-product, the alkyl halide that corresponds to the halogen of the carboxylic acid halide and the alkyl group from the trialkyl phosphate. A specific example of the reaction is provided by the reaction of triethyl phosphate with dimethylcarbamyl chloride to form the mixed acid anhydride of dimethylcarbamic acid and diethyl phosphoric acid according to the following apparent equation:

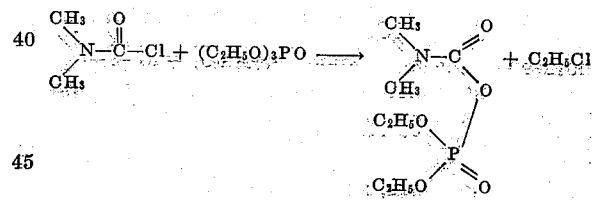

There may be formed in lesser amounts, depending upon the particular reaction conditions, mixed acid anhydrides in which two, or even all three of the valencies of the phosphoryl radical are satisfied by the acyl group of the dissimilar oxy-acid, the formation of these more complex mixed acid anhydrides presumably proceeding according to the following illustrative equations that are based upon the specific example used above:

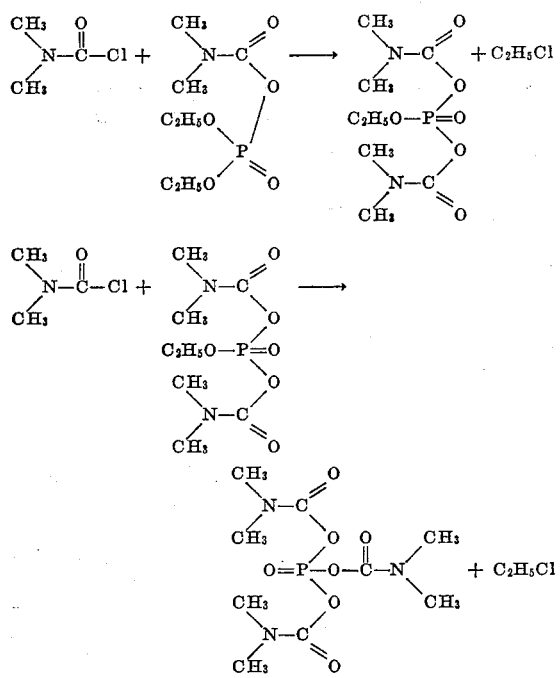

The method of the present invention, which invention is considered to be generic to the reaction of triesters, or neutral esters of phosphoric acid with acid halides of dissimilar acids to produce one or more mixed acid anhydrides containing an acyl group of each of the reactants, and to the process for effecting the same, is carried out by heating a mixture essentially comprising the phosphoric acid ester and the acid halide of the dissimilar acid at an elevated temperature that is conducive to the reaction but below a temperature at which decomposition of the reactants or products occurs. The reaction is flexible in the sense that the two reactants may be employed in various proportions relative to each other, the optimum proportions being determined in part by the particular product that is to be prepared and in part by the associated conditions under which the process is executed. The reaction is capable of being carried out non-catalytically, i. e., without added catalysts. Appropriate catalysts can be used, however, to increase the rate of reaction. Solvents, or diluents may be included in the reaction mixture. The reaction is favored by withdrawing from the reaction mixture, or otherwise separating from the reaction mixture, either continuously or intermittently, the organic halide that is derived from the ester radical or radicals of the phosphoric acid ester and the halogen of the acid halide. The reaction may be carried out under applied pressure. After the reaction has been effected, the required time depending upon the conditions and reactants used, recovery of product can be carried out by conventional methods, such as by fractional distillation, by treatment with selective solvents, by adsorption, etc. If desired, depending upon the intended use for the product, separation of the product from the reaction mixture may without departure from the invention be dispensed with and the crude mixture used either in its entirety or after removal only of any solvent that may be present, catalysts, unconsumed reactants, etc.

In a preferred method for carrying out the process of the invention, the triester of phosphoric acid is heated in admixture with the selected halide of the dissimilar acid, for example, a carboxylic acid chloride, at a temperature within the range of from about 75° C. to about 250° C., a preferred range being from about 100° C. to about 175° C. When the desired mixed acid anhydride contains but one anhydro grouping, that is, but two acyl groups—one derived from the phosphoric acid and the other from the dissimilar acid—the amount of the acid halide reactant desirably is limited to an amount within the range of from about 0.1 to about 1.5 moles, preferably from about 0.2 to about 1 mole, per mole of the phosphoric acid ester. When the desired mixed acid anhydride contains two or even three anhydro groupings, i. e., when it contains two or even three acyl groups of the dissimilar acid, proportionally larger amounts of the acid halide reactant are employed, such as up to about 5, 10, 15 or even more moles per mole of the phosphoric acid ester. Useful products are obtained with especial efficiency when there is employed from about 0.2 to about 5 moles of the acid halide reactant per mole of the phosphoric acid ester. The process may be carried out with the aid of superatmospheric pressures, as when one or both of the reactants otherwise would volatilize excessively from the reaction mixture. Alternatively, a volatile reactant may be added to the reaction mixture portionwise during the heating period, although the use of pressure is generally a preferable method of operation when the reaction temperature is above the atmospheric boiling point of a reactant. As the reaction commences and progresses, the organic halide that is formed as by-product of the reaction desirably is withdrawn from the reaction mixture either continuously or intermittently as it is formed. When the halogen ester has an appropriately low boiling point, it may be volatilized and allowed to escape from the reaction mixture as it forms. In other cases, it may be separated from the reaction mixture either intermittently or continuously, as by fractionation of the mixture or of a portion thereof, or by other appropriate methods, the choice of which will depend upon the particular system that is involved. The course of the reaction can be followed conveniently by measurement of the amount of evolved organic halide, by determination of the amount of acid anhydride present in the mixture, or by other appropriate methods. When the reaction has gone to substantial completion, generally after from about 1 to about 10 hours elapsed reaction time, or at any desired earlier time, the heating is discontinued and the resulting mixture worked up according to any suitable procedure for recovering the product or products in the desired state of purity. As indicated hereinbefore, distillation, treatment with selective solvents, and adsorption are among the methods that can be used.

As catalysts for the reaction there can be employed acid-acting substances as well as basic-acting substances. Acids, such as mineral acids and the various organic acids, can be used as suitable acid-acting substances, examples thereof including, among others, sulfuric, hydrochloric, hydrobromic, phosphoric, nitric, arsenic, boric, phosphorous, pyrophosphoric, and such organic acids as salicic, chloracetic, p-toluenesulfonic, oxalic, acetic, formic, benzenesulfonic, and chlorobenzoic acids. The strong acids, having dissociation constants in water greater than about $1\times10^{-5}$, are preferred. Bases, other than those that combine with acid halides to form salts or amides, particularly tertiary amines, are suitable as basic-acting substances, examples of such basic catalysts including, without being limited to, triethylamine, N,N-dimethylcyclohexylamine, tri-isobutylamine, N,N-dimethylaniline, N-ethylpiperidine, pyridine, and benzyltrimethylammonium and other quaternary ammonium salts, e. g., acetates, nitrates, chlorides, etc. The reaction is carried out under substantially anhydrous conditions. The catalyst, if one is employed, conveniently is one that is sufficiently soluble in the anhydrous reaction mixture to give the requisite concentration therein, a concentration of the catalyst of from about 0.001% to about 5% or more (weight basis) generally serving to provide a pronounced accelerating action in the reaction.

The following examples will illustrate certain of the numerous specific embodiments of the invention. It will be understood that the examples are presented with the intent of illustrating and not of limiting the invention, and that various modifications can be resorted to without departing from the letter and spirit of the invention as defined in the appended claims.

Example I

There were mixed 649 grams of triethyl phosphate and 334 grams of benzoyl chloride in a glass lined reaction vessel equipped with a water-cooled reflux condenser. The upper end of the condenser opened to the atmosphere through a cold-trap chilled with acetone-solid $CO_2$. The mixture was heated at 130° C. to 163° C. for 7 hours. During this time ethyl chloride was evolved and collected in the cold-trap, in the amount of 135 grams. The reaction mixture then was stripped of low-boiling constituents by distillation to a maximum kettle temperature of 157° C. under 1 to 2 mm. mercury pressure. The non-volatilized portion was dissolved in benzene, the solution was treated with Duolite A-2 resin (an anion-exchange synthetic resin produced commercially by the Chemical Process Company, San Francisco), and the filtrate was fractionally distilled. The fraction distilling between 130° C. and 149° C. under 1 to 2 mm. mercury pressure was collected separately and identified as the mixed anhydride of benzoic acid and diethyl phosphoric acid, having the structure

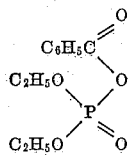

Anhydride value (equivalents of anhydride per 100 grams): Found, 0.369; calculated, 0.388. Refractive index ($n$ 20/D): 1.5000.

Example II

To 2220 grams of triethyl phosphate there were added 858 grams of benzoyl chloride and the mixture was heated as in Example I for 10 hours at 130° C. to 153° C. A fraction comprising the mixed acid anhydride of benzoic acid and diethyl phosphoric acid was recovered directly by distillation of the resulting mixture.

Example III

This example illustrates the effects of catalysts upon the reaction. The example comprises three preparations of the mixed acid anhydride of benzoic acid and diethyl phosphoric acid. In each run the reactants were employed in the ratio of 1 mole triethyl phosphate and 0.5 mole benzoyl chloride. The reaction temperature was 148° C. In each run the extent of reaction was determined by measurement of the amount of ethyl chloride evolved. The following results were observed:

| Catalyst | Amount, Percent | Extent of Reaction After 130 Minutes (Percent of Theory) |
|---|---|---|
| triethylamine | 1 | 78 |
| p-toluenesulfonic acid | 1 | 70 |
| none | | 42 |

Example IV

A mixture of equimolar amounts of benzoyl chloride and triethyl phosphate began to form ethyl chloride when heated to about 125° C. After about 95 minutes the mixture was freed of low-boiling constituents by heating to 150° C. under 2 mm. mercury pressure, leaving as product a mixture, obtained in 79% yield, containing the mixed acid anhydride of benzoic acid and diethyl phosphoric acid along with smaller amounts of the mixed anhydrides of benzoic acid and ethyl phosphoric acid and phosphoric acid. Elemental analysis of the mixture indicated the mixed acid anhydride of benzoic acid and diethyl phosphoric acid to be the chief product, as follows: Found, 11.1% P; 52.7% C; 5.4% H. Calculated for the mixed anhydride of benzoic acid and diethyl phosphoric acid, 12.0% P; 51.1% C; 5.8% H.

Example V

A mixture of 92.1 grams of phenylacetyl chloride and 218 grams of triethyl phosphate was heated at 135° C. to 155° C. for 1.4 hours. Ethyl chloride was evolved from the reaction mixture as the reaction progressed in an amount totalling 83.5% of theory. The resulting mixture then was stripped of lower low-boiling constituents by heating to a final kettle temperature of 155° C. under 2 mm. mercury pressure. The remaining portion of the mixture, amounting to 124 grams, contained the mixed anhydride of phenylacetic acid and diethyl phosphoric acid along with lesser amounts of the mixed anhydrides of phenylacetic acid and ethyl phosphoric acid and phosphoric acid. The anhydride value of the mixture was found to be 0.266 equivalent of anhydride per 100 grams compared to the calculated value of 0.367 equivalent of anhydride per 100 grams of the pure mixed anhydride of phenylacetic acid and diethyl phosphoric acid. The structures of these anhydrides are represented by the formulas:

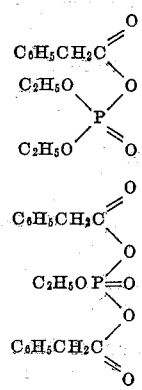

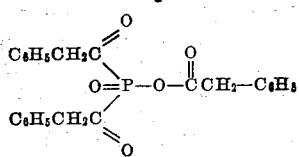

Example VI

A mixture of 70.3 grams of benzoyl chloride and 274 grams of trimethyl phosphate was heated at 133° C. to 145° C. for 2 hours. Methyl chloride was liberated from the reaction mixture during this time in an amount representing 96% of theory. The resulting mixture then was fractionally distilled. The fraction distilling between 120° C. and 145° C. under 2 to 3 mm. mercury pressure was collected separately as the product, the mixed anhydride of benzoic acid and dimethyl phosphoric acid. The structure of this mixed anhydride is represented by the formula:

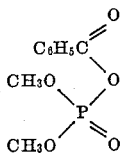

Example VII

A mixture of 70.3 grams of benzoyl chloride and 199 grams of tributyl phosphate was heated at 150° C. to 185° C. for 3 hours, n-butyl chloride being evolved as the reaction progressed. The amount of n-butyl chloride liberated in this time amounted to 68% of theory. The resulting mixture then was fractionally distilled, a fraction of 46 grams being separated from the distillate at 120° C. to 142° C. under a pressure of 1 to 2 mm. mercury. A higher-boiling fraction of 104 grams was allowed to remain in the still kettle. The fraction of the distillate contained the mixed anhydride of benzoic acid and dibutyl phosphoric acid. The undistilled fraction contained, in addition to this mixed anhydride, the anhydrides of benzoic acid and butyl phosphoric acid and phosphoric acid. The structures of these three anhydrides can be represented by the following formulas:

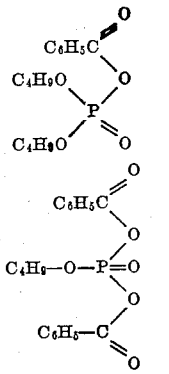

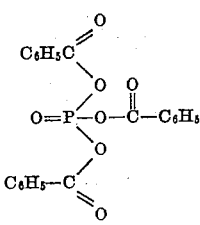

In a manner similar to that illustrated in the foregoing examples there can be prepared other mixed acid anhydrides derived from aromatic carbocyclic monocarboxylic acids and phosphoric acid, having structures that can be represented by the general formula:

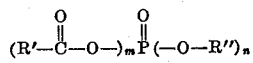

in which

signifies the acyl residue of an aromatic carbocyclic monocarboxylic acid, —O—R'' signifies the residue of an aliphatic monohydric alcohol denoted by R''OH, $m$ signifies a whole number having a value not less than 1 nor greater than 3, and $n=3-m$. Additional illustrative mixed acid anhydrides that have structures corresponding to this formula and that can be similarly prepared include, among others, the following: mixed acid anhydride of p-toluic acid and dibutyl phosphoric acid; mixed acid anhydride of p-nitrobenzoic acid and monoisopropyl phosphoric acid; mixed acid anhydride of p-chloro-m-methylbenzoic acid and di-2-cyanoethyl phosphoric acid; mixed acid anhydride of 2,4,5-trichlorophenylacetic acid and dioctyl phosphoric acid; mixed acid anhydride of o-carbethoxybenzoic acid and di-2-isothiocyanoethyl phosphoric acid; mixed acid anhydride of p-phenylbenzoic acid and bis(3-methoxypropyl) phosphoric acid; mixed acid anhydride of p-t-butylbenzoic acid and diethyl phosphoric acid; mixed acid anhydride of p-t-butylbenzoic acid and diallyl phosphoric acid; mixed acid anhydride of p-t-butylbenzoic acid and mono(2-ethoxyethyl) phosphoric acid; mixed acid anhydride of of p-t-octylbenzoic acid and bis(3,5,5-trimethylhexyl) phosphoric acid; mixed acid anhydride of benzoic acid and dilauryl phosphoric acid; mixed acid anhydride of benzoic acid and 2-chloroallyl phosphoric acid; mixed acid anhydride of p-allylbenzoic acid and diethyl phosphoric acid; mixed acid anhydride of p-dodecylbenzoic acid and dioctyl phosphoric acid.

The mixed anhydrides of this group appear to be of particular utility as insecticidally active compounds. Tests that have been carried out as an outgrowth of this invention have indicated that, by virtue of their high insecticidal activity, mixed anhydrides of the above formula, i. e., having the acyl radical of an aromatic carbocyclic monocarboxylic acid bonded directly through oxygen to the phosphoryl radical, are readily distinguishable from the apparently similar compounds that contain but the acyl radical of a lower fatty acid in place of the acyl radical of the aromatic acid. In the following tests, infested plants were sprayed with solutions prepared by dissolving products prepared in the foregoing examples in a diluent spray oil and the results were compared with the results of similar tests in which the mixed acid anhydrides of acetic acid and diethyl phosphoric acid (prepared in Example VIII) and acetic acid and dibutyl phosphoric acid (prepared in Example IX), respectively, were employed. All of the tests were run under controlled conditions that differed only with respect to the product being tested and the concentration thereof in the spray oil. Thus, the same volume of spray and the same conditions of spraying were used in each test. The results shown in the following table were observed:

| Product of Example No. | Concentration in Diluent Oil (Weight Percent) | Percentage Kill | |
|---|---|---|---|
| | | Plant Infested with Pea Aphid (*macrosiphum pisi*) | Plant Infested with Milkweed Bug (*Oncopeltus fasciatus*) (Dallas) |
| IV | 1 | | 55 |
| | 0.1 | 54 | |
| V | 1 | 93 | 78 |
| VI | 0.1 | 26 | |
| VII | 0.1 | 82 | |
| VIII | 1 | 32 | 0 |
| IX | 5 | 40 | 33 |

*Example VIII*

To 98 grams of triethyl phosphate at 120° C. to 150° C. there were added portionwise over a period of 11 hours 39 grams of acetyl chloride, ethyl chloride being evolved from the mixture as the reaction progressed. The resulting mixture then was rapidly distilled from a Claisen flask and the distillate was fractionated by redistillation. The mixed acid anhydride of acetic acid and diethyl phosphoric acid, having the structure

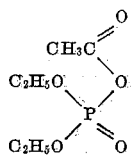

was recovered as the fraction distilling between 91.3° C. and 98° C. under a pressure of 3 mm. mercury. Analyses: Found, 36.8% C; 6.7% H; anhydride value, 0.44. Calculated, 36.7% C; 6.7% H; anhydride value, 0.51. Higher boiling products of the reaction were indicated to contain the mixed acid anhydrides of acetic acid and ethyl phosphoric acid and phosphoric acid, having the respective structures:

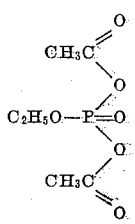

and

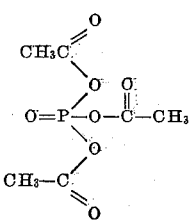

*Example IX*

To 195 grams of triethyl phosphate at 120° C. to 150° C. there were added portionwise over a period of 10 hours 81 grams of propionyl chloride. As the propionyl chloride was added ethyl chloride was slowly evolved from the reaction mixture. The resulting mixture then was rapidly distilled from a Claisen flask and the distillate was fractionated by redistillation. The mixed anhydride of propionic acid and diethyl phosphoric acid, having the structure

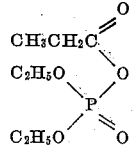

was recovered as the fraction distilling between 71° C. and 74° C. under a pressure of 1 to 2 mm. mercury. Analyses: Found, 40.2% C; 7.5% H; anhydride value, 0.43. Calculated, 40.0% C; 7.2% H; anhydride value, 0.48.

*Example X*

A mixture of 130.5 grams of furoyl chloride and 364 grams of triethyl phosphate was heated at 143° C. to 156° C. for 7.5 hours, ethyl chloride being evolved from the mixture and collected in a cold trap as in the preceding examples. When the reaction was discontinued the amount of ethyl chloride that had been collected amounted to 76% of theory. The reaction mixture then was fractionally distilled under a pressure of 2 to 3 mm. mercury. There were obtained 137 grams of product distilling between 140° C. and 152° C. The collected product, the mixed anhydride of furoic acid and diethyl phosphoric acid, was found to have the following elemental analyses: Found, 45.3% C; 5.7% H; 11.5% P. Calculated, 43.55% C; 5.28% H; 12.48% P. The structure of the mixed anhydride of furoic acid and diethyl phosphoric acid is

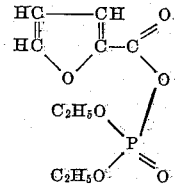

*Example XI*

To 218 grams of triethyl phosphate there were added 64 grams of dimethylcarbamyl chloride and the mixture was heated at 146° C. to 152° C. for 1.1 hours, ethyl chloride being evolved as the reaction progressed. The reaction mixture then was heated under 2 mm. mercury pressure to 135° C. in order to remove any lower boiling materials that were present. The resulting mixture was found to contain, as the principal product, the mixed acid anhydride of dimethylcarbamic acid and diethyl phosphoric acid with lesser amounts of the mixed acid anhydrides of dimethylcarbamic acid and ethyl phosphoric acid and phosphoric acid, respectively. The structures of these anhydrides can be represented by the following structural formulas:

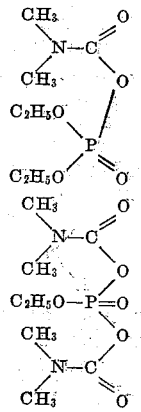

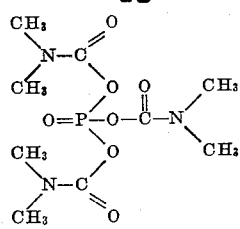

Tests of the product showed it to have a high insecticidal activity when sprayed as a 0.1% solution in a diluent spray oil upon infested plants. Further tests showed the product to have the desirable property of activity as a systemic poison, that is, when applied to the soil in the vicinity of plants it was absorbed by the plant and rendered the plant as a whole toxic to insects.

Example XII

To 287 grams of triethyl phosphate there were added 113 grams of diethylthiocarbamyl chloride. The mixture was heated at 118° C. to 155° C. for 1.4 hours, during which time lower-boiling material, mostly ethyl chloride, was volatilized from the mixture. The mixture was then freed of the more volatile constituents by heating at 122° C. under 4 millimeters mercury pressure followed by further heating in a molecular still at 56° C. under 0.035 millimeter mercury pressure. The residue then was molecularly distilled at 101° C. under $10^{-5}$ millimeter mercury pressure. There were obtained 75 grams of a yellow distillate ($n$ 20/D 1.5068) that by analysis was a mixture of the mixed acid anhydrides of diethylthiocarbamic acid and diethyl phosphoric acid and ethyl phosphoric acid.

The mixed acid anhydrides prepared in Examples XI and XII are illustrative members of a novel class of insecticidally active mixed acid anhydrides that can be represented by the structural formula

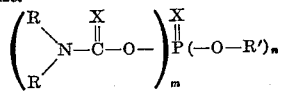

in which the group

is the amino residue of an organic primary or secondary amine represented by

the group —O—R' signifies the residue of an alcohol or phenol denoted by R'OH, $m$ signifies a whole number having a value not less than 1 nor greater than 3, X represents a chalcogen element having an atomic number that is an integral multiple of 8 (i. e., oxygen or sulfur), and $n=3-m$. Of this group, those wherein each X represents oxygen are of particular value and are preferred. The radical denoted by each R is preferably an alkyl, aryl, or an alkaryl radical. The group represented by

may comprise an N-heterocyclic ring that includes the nitrogen atom, e. g., piperidino, pyrrolidino, morpholino, or alkyl substitution products of the same. Additional illustrative compounds of this group, which can be prepared by the procedure of this invention include, among others: mixed acid anhydride of piperidine-N-carboxylic acid and butyl phosphoric acid; mixed acid anhydride of diisopropylcarbamic acid and diphenethyl phosphate; mixed acid anhydride of N-methylphenylcarbamic acid and 2-ethoxyethyl phosphoric acid; mixed acid anhydride of bis(1,3-dimethylbutyl)carbamic acid and dioctyl phosphoric acid; mixed acid anhydride of N-isopropyloctylcarbamic acid and bis(2-chloroethyl) phosphoric acid; mixed acid anhydride of bis(p-chlorophenyl)carbamic acid and dimethyl phosphoric acid; mixed acid anhydride of diisopropylcarbamic acid and diallyl phosphoric acid; mixed acid anhydride of diisopropylcarbamic acid and monoallyl phosphoric acid; mixed acid anhydride of 2-methylpiperidine-N-carboxylic acid and dioctyl phosphoric acid; mixed acid anhydride of 4-chlorobutyl N-(3-chloroallyl)isopropylcarbamic acid and diethyl phosphoric acid; mixed acid anhydride of dimethyl carbamic acid and butyl phosphoric acid; mixed acid anhydride of bis(1,3-dimethylbutyl)carbamic acid and dilauryl phosphoric acid; mixed acid anhydride of ditetrahydrofurfurylcarbamic acid and dipropyl phosphoric acid; mixed acid anhydride of dibutylcarbamic acid and dibutyl phosphoric acid; mixed acid anhydride of dicyclohexylcarbamic acid and dimethylphosphoric acid; mixed acid anhydride of dimethylthiocarbamic acid and ethyl phosphoric acid; mixed acid anhydride of diisopropylthiocarbamic acid and dibutyl phosphoric acid; mixed acid anhydride of diethylthiocarbamic acid and p-nitrophenyl phosphoric acid; mixed acid anhydride of diphenylthiocarbamic acid and di-2-chloroethyl phosphate; and mixed acid anhydride of dioctylthiocarbamic acid and propyl phosphoric acid.

Still further specific embodiments of the present invention are illustrated in the following examples.

Example XIII

A mixture of 98.5 grams of methanesulfonyl chloride and 365 grams of triethyl phosphate was heated at 135° C. to 148° C. for 3.25 hours. During this time ethyl chloride was evolved from the reaction mixture in an amount corresponding to 64.5% of theory. The mixture then was stripped of low-boiling materials by heating under about 1 mm. mercury pressure to about 60° C. leaving an undistilled fraction containing the mixed anhydride of methanesulfonic acid and diethyl phosphoric acid. The structure of this mixed acid anhydride can be represented by the formula

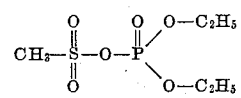

Example XIV

Chloroacetyl chloride and triethyl phosphate were reacted according to the method illustrated in the preceding two examples to produce a mixture containing the mixed acid anhydride of chloroacetic acid and diethyl phosphoric acid. The structure of this mixed anhydride can be represented by the formula

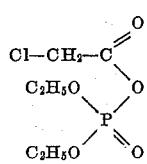

As shown by the foregoing examples, the method of the present invention can be applied to the synthesis of a wide variety of mixed acid anhydrides in which the phosphoryl group is attached directly through oxygen to at least one acyl group of an organic oxy-acid of a dissimilar element, in which any valencies of the phosphoryl group that are not thus satisfied are united through oxygen to an ester residue, e. g., to the residue of an alcohol or a phenol. The structure of the mixed acid anhydrides that can be produced by the process of this invention can be represented by the general structural formula

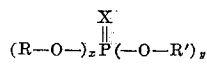

in which R represents the acyl group of the acid that is referred to herein as the dissimilar acid, R' represents the ester residue of the phosphoric acid ester used as reactant, X represents oxygen or sulfur, $x$ represents a whole number not less than 1 and not greater than 3, and $y$ represents a whole number such that $x+y$ always equals 3. Typical acid halides that can be reacted with triesters of phosphoric acid according to the invention to produce such mixed acid anhydrides include acid halides of unsubstituted fatty acids, such as acetyl chloride, propionyl chloride, butyryl chloride, valeryl chloride, caproyl chloride, caprylyl chloride, pelargonyl chloride, capryl chloride, lauryl chloride, myristyl chloride, palmityl chloride, stearyl chloride, and their homologs and various branched-chain isomers; acid halides of unsaturated aliphatic acids, such as acrylyl chloride, methacrylyl chloride, crotonyl chloride, hydrosorbyl chloride, tetrolyl chloride, oleyl chloride, linoleyl chloride, and 2,4-pentadienoyl chloride; acid halides of aromatic acids, such as benzoyl chloride, toluyl chloride, naphthoyl chloride, cinnamyl chloride, biphenylacetyl chloride, p-chloroformylbenzoic acid, terephthaloyl chloride, p-t-butylbenzoyl chloride, o-methyl-p-t-butylbenzoyl chloride, and p-octadecylbenzoyl chloride; acid halides of carbonic acid and of functional derivatives of carbonic acid, such as phosgene, carbamyl chloride, methylcarbamyl chloride, diethylcarbamyl chloride, ethyl chloroformate, propyl chloroformate, n-octyl chloroformate, phenyl chloroformate, N-piperidinecarbonyl chloride, bis(1,3-dimethylbutyl)carbamyl chloride, diallylcarbamyl chloride, N-phenylmethylcarbamyl chloride, and cyclohexyl chloroformate; acid halides of cycloaliphatic acids, such as cyclopentanecarbonyl chloride, dimethylcyclopentanecarbonyl chloride, and cyclohexanecarbonyl chloride; and acid halides of polycarboxylic acids, such as 3-chloroformylpropionic acid, adipyl chloride, succinyl chloride, phthalyl chloride, tetrachloro-2,5-endomethylenetetrahydrophthalyl chloride, and glutaryl chloride. Acid halides of other organic acids than carboxylic acids can be employed in accordance with the process of the generic invention to produce mixed acid anhydrides as hereinbefore described; and as such other acid halides there come into consideration particularly acid halides of thionocarboxylic acids, such as thioacetyl chloride, thiopropionyl chloride, thiobutyryl chloride, thiobenzoyl chloride, dimethylthiocarbamyl chloride, dipropylthiocarbamyl chloride, thiophosgene, 2,3-dichlorothiobutyryl chloride and p-nitrophenylthioacetyl chloride, and acid halides of organic sulfonic and sulfinic acids, such as methane sulfonyl chloride, benzene sulfonyl chloride, 1-butanesulfonyl chloride, and benzenesulfinyl chloride; and the seleno, the telluro, the borono, the silico, and the arseno analogs of such sulfonic and sulfinic acid halides. The acid halide that is reacted with the phosphoric acid ester according to the invention may be defined in the generic sense as being of the class consisting of the acid halides of oxy-acids of polyvalent oxide-forming non-metallic elements other than phosphorus and the analogs of such oxy-acids wherein oxygen of the acid function is replaced by sulfur. The preferred acid halides are those derived from the carboxylic acids. The organic residue of the acid halide may be unsubstituted, e. g., an unsubstituted hydrocarbon group, or it may contain one or more inert substituents, such as cyano, nitro, sulfo, halogen, e. g., chlorine, bromine, or fluorine, the ether group, or —O— linkage, the ester group, or —O—OC— linkage, the mercapto group, or —S— linkage, or the ketonic (—CO—) group.

As to the halogen of the acid halide, for reasons of availability and cost, the acid chloride ordinarily is used. The process of the invention is not limited to the acid chlorides, however, and the corresponding acid halides containing other halogens, e. g., bromine, iodine or fluorine, can be used instead. The chlorides and bromides are preferred.

As the ester of phosphoric acid, there may be employed in accordance with the invention any neutral ester, or triester, of phosphoric acid. There also may be employed, although less desirably, corresponding esters of thiophosphoric acid, (HO)₃PS. Illustrative esters are the esters of phosphoric acid and aliphatic alcohols, such as the trialkyl esters and the substituted trialkyl esters of phosphoric acid, e. g., triethyl phosphate, tris(2-chloroethyl) phosphate, trioctyl phosphate, tris(2-ethoxyethyl) phosphate, triisobutyl phosphate, tris(3,5,5-trimethylhexyl) phosphate, diethyl cyanoethyl phosphate, and methyl diethyl phosphate as well as aryl esters of phosphoric acid, such as tricresyl phosphate, triphenyl phosphate, diethyl phenyl phosphate, dinaphthyl butyl phosphate, tris(p-methoxyphenyl) phosphate, tris(p-nitrophenyl) phosphate, and bis(p-carbethoxyphenyl) ethyl phosphate, the lower trialkyl esters being preferred. Illustrative esters of thiophosphoric acid include, among others, triethyl thiophosphate, trimethylthiophosphate, tripropyl thiophosphate, triphenyl thiophosphate, etc. The three ester groups of the phosphoric acid ester may be the same or they may be dissimilar. One or more of the ester groups may be substituted by inert substituents, as by one or more of cyano, halogen, alkoxy, carboalkoxy, isocyano, or mercapto, or the ester groups preferably may all be residues of unsubstituted lower aliphatic alcohols. The process of the invention is particularly effective for the preparation of desired mixed acid anhydrides from neutral esters of phosphoric acid and lower aliphatic monohydric alcohols.

The mixed acid anhydrides that are produced according to the process of this invention include materials that are useful as insecticides, germicides, fungicides, and like toxicants. In such uses they may be applied in the form of solutions, emulsions or suspensions in inert liquid diluents, in dust form, carried by solid finely-divided carrier material, alone or in conjunction with previously known insecticides, germicides, fungicides, etc. When used as systemic poisons the toxicant is applied to or into the ground in the vicinity of the plant, or directly onto the plant, whereupon it is absorbed by the plant rendering the plant as a whole toxic to many pests. Additional uses that come into consideration for products that can be produced by the process of this invention are as additives for gasolines and other fuels for internal combustion engines, additives for oils and greases, and intermediates in organic syntheses.

I claim as my invention:

1. Process for the production of a mixed acid anhydride which comprises heating dimethylcarbamyl chloride and triethyl phosphate in admixture in mole proportion of from about 0.5 : 1 to about 1 : 1 at a temperature of from about 100° C. to about 200° C. to produce a product comprising mixed acid anhydride of dimethylcarbamic acid and diethyl phosphoric acid.

2. Process for the production of a mixed acid anhydride which comprises heating dialkylcarbamyl chloride and trialkyl phosphate in admixture in mole proportion of at least about 0.1 : 1 at a temperature of from about 100° C. to about 250° C. to produce a product comprising mixed acid anhydride of dialkylcarbamic acid and an alkyl phosphoric acid.

3. Process for the production of a mixed acid anhydride which comprises heating a mixture comprising about one mole of a trialkyl phosphate and from about 0.1 to about 5 moles of an N-disubstituted carbamyl chloride at a temperature of from about 75° C. to about 250° C. and continuing the heating until there is formed a product comprising mixed acid anhydride containing the phosphoryl group and N-disubstituted carbamyl group interconnected directly through one atom of oxygen.

4. Mixed acid anhydride of dimethylcarbamic acid and diethyl phosphoric acid.

5. Mixed acid anhydride of dialkylcarbamic acid and dialkyl phosphoric acid.

6. Mixed acid anhydride of N-disubstituted carbamic acid and phosphoric acid having at least one but not more than two acid functions of said phosphoric acid combined in ester linkage with an aliphatic monohydric alcohol and the other acid functions of said phosphoric acid combined in the acid anhydride linkage thereof.

7. A mixed acid anhydride having a structure represented by the formula

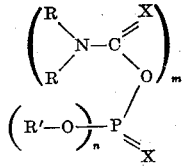

in which the group

is the amino residue of an organic amine represented by

each group —O—R' signifies the residue of a member of the class consisting of alcohols and phenols denoted by R'OH, X represents an atom of a chalcogen element having an atomic number that is an integral multiple of 8, $m$ signifies a whole number having a value not less than 1 nor greater than 3, and $n=3-m$.

8. Process for the production of a mixed acid anhydride which comprises heating benzoyl chloride and triethyl phosphate in admixture in mole proportion of from about 0.1 : 1 to about 1.5 : 1 at a temperature of from about 100° C. to about 200° C. to produce a product comprising mixed acid anhydride of benzoic acid and diethyl phosphoric acid.

9. Process for the production of a mixed acid anhydride which comprises heating an acid chloride of an aromatic carbocyclic monocarboxylic acid and a trialkyl phosphate in admixture in mole proportion of from about 0.1 : 1 to about 5 : 1 at a temperature of from about 75° C. to about 250° C. to produce a product comprising mixed acid anhydride of the aromatic carbocyclic monocarboxylic acid and an alkyl phosphoric acid.

10. Process for the production of a mixed acid anhydride which comprises heating an acid halide of an aromatic carbocyclic monocarboxylic acid and a triester of phosphoric acid with at least one of the class consisting of alcohols and phenols in admixture in mole proportion of at least about 0.1 : 1 at a temperature of from about 75° C. to about 250° C. to produce a product comprising mixed acid anhydride wherein the acyl group of said aromatic carbocyclic monocarboxylic acid is connected directly through an atom of oxygen to the phosphoryl radical.

11. Mixed acid anhydride of benzoic acid and diethyl phosphoric acid.

12. Mixed acid anhydride of benzoic acid and monoethyl phosphoric acid.

13. A mixed acid anhydride having a structure represented by the formula

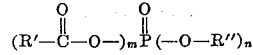

in which

signifies the acyl residue of an aromatic carbocyclic monocarboxylic acid, —O—R'' signifies the residue of an aliphatic monohydric alcohol denoted by R''OH, $m$ signifies a whole number having a value not less than 1 nor greater than 3, and $n=3-m$.

14. Process for the production of a mixed acid anhydride which comprises heating an aliphatic sulfonic acid chloride and a trialkyl phosphate in admixture in mole proportion of from about 0.1:1 to about 1.5:1 at a temperature of from about 100° C. to about 175° C. to produce a product comprising mixed acid anhydride of said aliphatic sulfonic acid and dialkyl phosphoric acid.

15. Process for the production of a mixed acid anhydride which comprises heating together a triester of phosphoric acid with at least one of the class consisting of alcohols and phenols and a carboxylic acid halide in mole proportion of at least about 0.1:1 at a temperature of from about 100° C. to about 175° C.

16. Process which comprises heating a triester of a phosphoric acid of the class consisting of phosphoric acid and thiophosphoric acid with at least one of the class consisting of alcohols and phenols together with at least about 0.1 mole per mole of said triester of an acid chloride of a dissimilar acid at a temperature of from about 100° C. to about 175° C. to produce a product comprising mixed acid anhydride of said dissimilar acid and the corresponding diester of phosphoric acid.

17. Process which comprises heating a triester of a phosphoric acid of the class consisting of phosphoric acid and thiophosphoric acid with at least one of the class consisting of alcohols and phenols together with a reactive proportion of an acid halide of a dissimilar acid to produce a mixed acid anhydride wherein the phosphoryl radical and the acyl group of said dissimilar acid are interconnected directly through an atom of oxygen.

RICHARD R. WHETSTONE.

References Cited in the file of this patent

UNITED STATES PATENTS

| Number | Name | Date |
| --- | --- | --- |
| 2,478,377 | Dickey | Aug. 9, 1949 |
| 2,486,658 | Kosolapoff | Nov. 1, 1949 |

OTHER REFERENCES

Brooks, J. Am. Chem. Soc., vol. 34, pages 492 to 499 (1912).